(12) United States Patent
Nikara et al.

(10) Patent No.: US 8,661,200 B2
(45) Date of Patent: Feb. 25, 2014

(54) CHANNEL CONTROLLER FOR MULTI-CHANNEL CACHE

(75) Inventors: Jari Nikara, Lempaala (FI); Eero Aho, Tampere (FI); Kimmo Kuusilinna, Berkeley, CA (US)

(73) Assignee: Nokia Corporation, Espoo (FI)

( * ) Notice: Subject to any disclaimer, the term of this patent is extended or adjusted under 35 U.S.C. 154(b) by 851 days.

(21) Appl. No.: 12/701,171

(22) Filed: Feb. 5, 2010

(65) Prior Publication Data

US 2011/0197028 A1  Aug. 11, 2011

(51) Int. Cl.
*G06F 12/00* (2006.01)

(52) U.S. Cl.
USPC ..... 711/129; 711/118; 711/131; 711/E12.046

(58) Field of Classification Search
None
See application file for complete search history.

(56) References Cited

U.S. PATENT DOCUMENTS

| | | | |
|---|---|---|---|
| 6,405,322 B1 | 6/2002 | Gaither et al. | 714/5 |
| 6,430,672 B1 | 8/2002 | Dhong et al. | 711/220 |
| 6,493,800 B1 | 12/2002 | Blumrich | 711/129 |
| 6,604,174 B1 * | 8/2003 | Dean et al. | 711/131 |
| 7,558,920 B2 | 7/2009 | Mattina et al. | 711/133 |
| 2007/0005890 A1 | 1/2007 | Gabel et al. | 711/118 |
| 2007/0283121 A1 | 12/2007 | Irish et al. | 711/202 |
| 2008/0034024 A1 | 2/2008 | Savell et al. | 708/313 |
| 2008/0034162 A1 * | 2/2008 | Sturges et al. | 711/129 |
| 2009/0216953 A1 | 8/2009 | Rossi | 711/128 |
| 2010/0036997 A1 | 2/2010 | Brewer et al. | 711/5 |
| 2010/0058025 A1 * | 3/2010 | Kuusilinna et al. | 711/207 |
| 2010/0318742 A1 * | 12/2010 | Plondke et al. | 711/123 |
| 2010/0325366 A1 | 12/2010 | Zamsky et al. | 711/142 |
| 2011/0138160 A1 * | 6/2011 | Sato et al. | 713/2 |

FOREIGN PATENT DOCUMENTS

| | | |
|---|---|---|
| CN | 1558331 A | 12/2004 |
| DE | 19643688 A1 | 5/1998 |
| JP | 05158793 A | 6/1993 |
| WO | WO 2010/023356 A1 | 3/2010 |
| WO | WO 2011/032593 A1 | 3/2011 |

OTHER PUBLICATIONS

E. Aho, "Design and Implementation of Parallel Memory Architectures", Dr. Tech. Thesis, Tampere University of Technology, Tampere, Finland, 2006, p. 191.

D.A. Patterson and J. L. Hennessy, "The Basics of Caches", Computer organization and design: the hardware/software interface, Morgan Kaufmann, San Francisco, California, 1994, pp. 545-553.

Lin, et al.; *Enabling Software Management for Multicore Caches with a Lightweight Hardware Support*; High Performance Networking Storage and Analysis, Proceedings of the Conference on, ACM, Nov. 14, 2009 (12 pages).

Varadarajan, et al.; *Molecular Caches: A caching structure for dynamic creation of application-specific Heterogeneous cache regions*; Microarchitecture, 2006, MICRO-39. 39th Annual IEE/ACM International Symposium on, IEEE, PI, Dec. 1, 2006 (pp. 433-442).

* cited by examiner

*Primary Examiner* — Reginald Bragdon
*Assistant Examiner* — Baboucarr Faal
(74) *Attorney, Agent, or Firm* — Harrington & Smith

(57) ABSTRACT

Disclosed herein is a channel controller for a multi-channel cache memory, and a method that includes receiving a memory address associated with a memory access request to a main memory of a data processing system; translating the memory address to form a first access portion identifying at least one partition of a multi-channel cache memory, and at least one further access portion, where the at least one partition includes at least one channel; and applying the at least one further access portion to the at least one channel of the multi-channel cache memory.

30 Claims, 10 Drawing Sheets

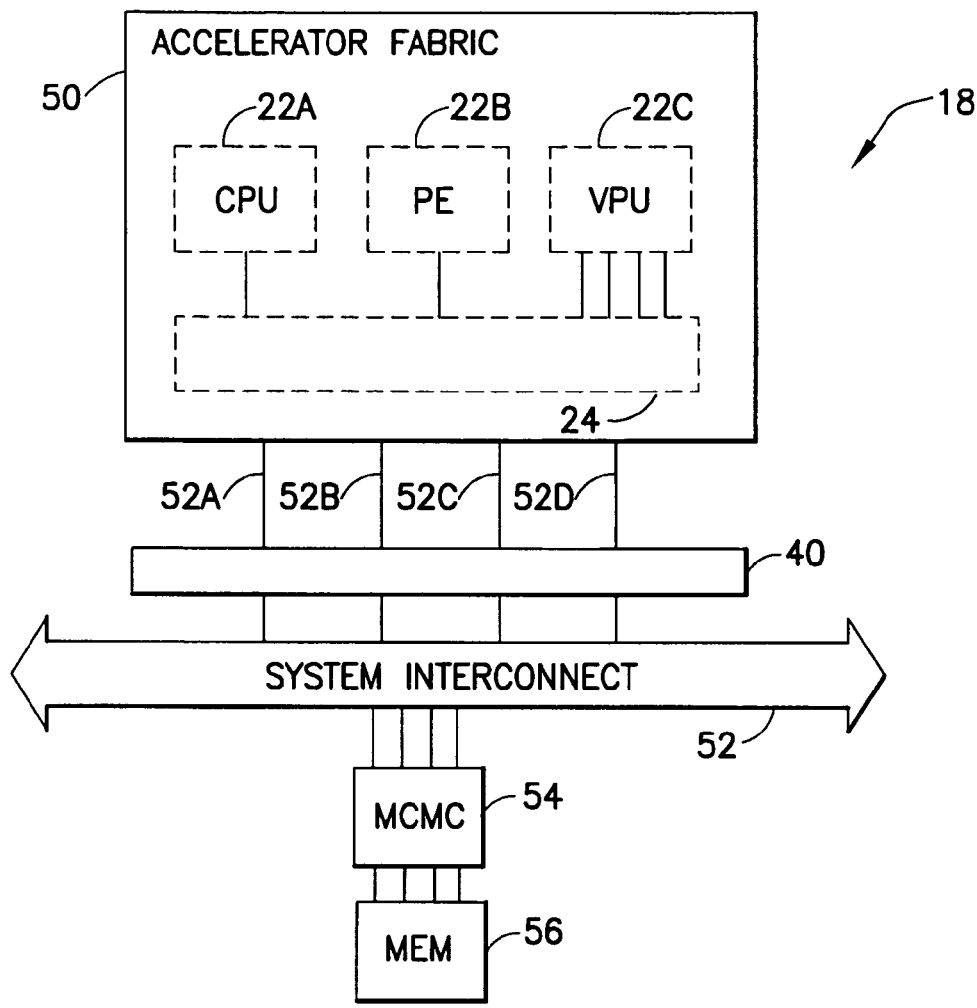
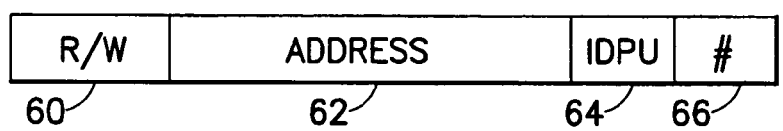
FIG.6A
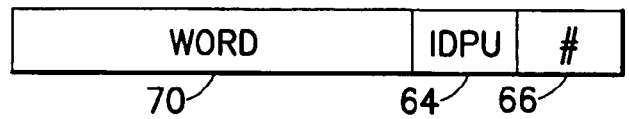
FIG.6B

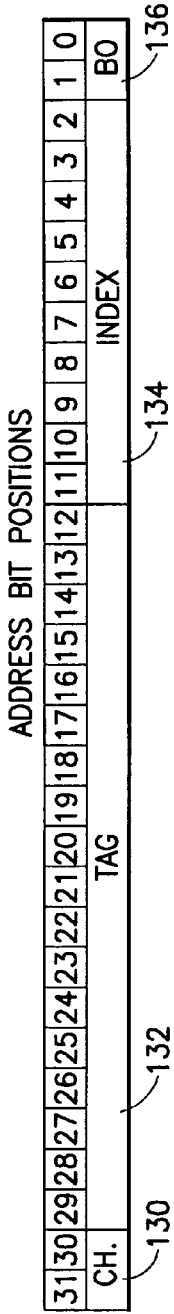
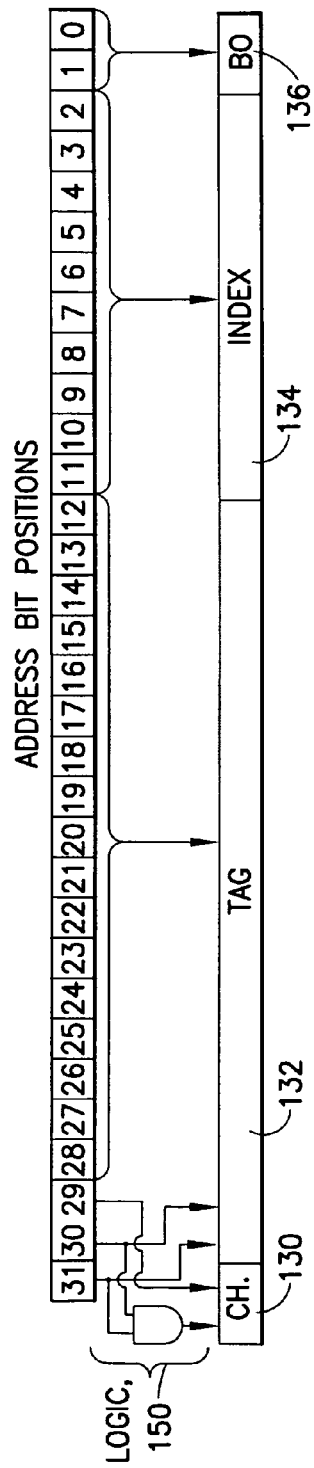
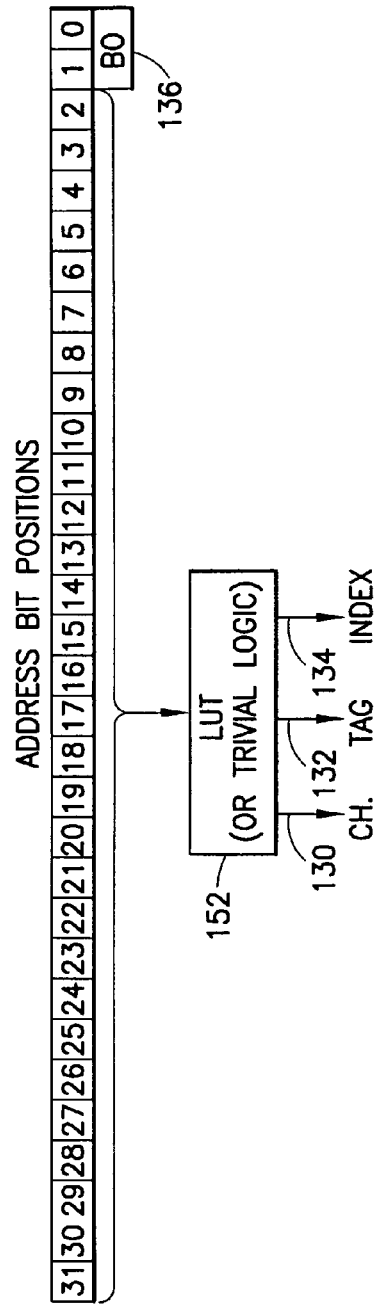
FIG.9A
FIG.9B
FIG.9C

CHANNEL CONTROLLER FOR MULTI-CHANNEL CACHE

TECHNICAL FIELD

The exemplary and non-limiting embodiments of this invention relate generally to data storage systems, devices, apparatus, methods and computer programs and, more specifically, relate to cache memory systems, devices, apparatus, methods and computer programs.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

BO byte offset
CPU central processing unit
DRAM dynamic random access memory
EPM energy and power management
HW hardware
LSB least significant bit
LUT look-up table
MCC multi-channel cache
MCC CTRL multi-channel cache controller
MCMC multi-channel memory controller
MMU memory management unit
PE processing element
SIMD single instructions, multiple data
SW software
TLB translation look-aside buffer
VPU vector processing unit
µP microprocessor Processing apparatus typically comprise one or more processing units and a memory. In some cases accesses to the memory may be slower than desired. This may be due to, for example, contention between parallel accesses and/or because the memory storage used has a fundamental limit on its access speed. To alleviate this problem a cache memory may be interposed between a processing unit and the memory. The cache memory is typically smaller than the memory and may use memory storage that has a faster access speed.

Multiple processing units may be arranged with a cache available for each processing unit. Each processing unit may have its own dedicated cache. Alternatively a shared cache memory unit may comprise separate caches with the allocation of the caches between processing units determined by an integrated crossbar.

SUMMARY

The foregoing and other problems are overcome, and other advantages are realized, in accordance with the exemplary embodiments of this invention.

In a first aspect thereof the exemplary embodiments of this invention provide a method that comprises receiving a memory address associated with a memory access request to a main memory of a data processing system; translating the memory address to form a first access portion identifying at least one partition of a multi-channel cache memory, and at least one further access portion, where the at least one partition is comprised of at least one channel; and applying the at least one further access portion to the at least one channel of the multi-channel cache memory.

In another aspect thereof the exemplary embodiments of this invention provide an apparatus that comprises a receiver configured to receive a memory address associated with a memory access request to a main memory; a translator configured to translate the received memory address to form a first access portion identifying at least one partition of a multi-channel cache memory and at least one further access portion, where the at least one partition is comprised of at least one channel; and an output configured to apply the at least one further access portion to the identified at least one channel of the multi-channel cache memory.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIGS. 1-6 show embodiments of the exemplary embodiments of the invention described in commonly-owned PCT/EP2009/062076, and are useful for enhancing the understanding of the exemplary embodiments of this invention, where FIG. 1 schematically illustrates a method relating to the use of multiple cache channels for a memory;

FIG. 3 schematically illustrates the functional components of a system suitable for performing the method of FIG. 1;

FIG. 4 schematically illustrates a multi-channel cache memory unit;

FIG. 5 schematically illustrates one example of a physical implementation of the system;

FIG. 6A illustrates an example of a memory access request including one or more identification references; and FIG. 6B illustrates an example of a typical response following a read access.

FIGS. 7-11 show embodiments of the exemplary embodiments of this invention, where FIG. 7 illustrates an exemplary system architecture with multi-channel cache and a multi-channel cache controller, in accordance with the exemplary embodiments of this invention;

FIG. 8A shows a balanced allocation and FIG. 8B shows unbalanced allocation;

FIGS. 9A-9C, collectively referred to as FIG. 9, illustrate non-limiting examples of address interpretation with a 4-channel cache, where FIG. 9A depicts a direct interpretation of bit fields, FIG. 9B illustrates interpreting bit fields with logic, and FIG. 9C shows a LUT-based (generalized) address interpretation;

FIG. 10 shows the multi-channel cache controller of FIG. 7 in greater detail; and FIG. 11 is a logic flow diagram that is useful when describing a method, and the result of execution of computer program instructions, in accordance with the exemplary embodiments.

DETAILED DESCRIPTION

Before describing in detail the exemplary embodiments of this invention it will be useful to review with reference to FIGS. 1-6 the multi-channel cache (MCC) memory described in commonly-owned PCT/EP2009/062076, filed Sep. 17, 2009.

Figure 1:
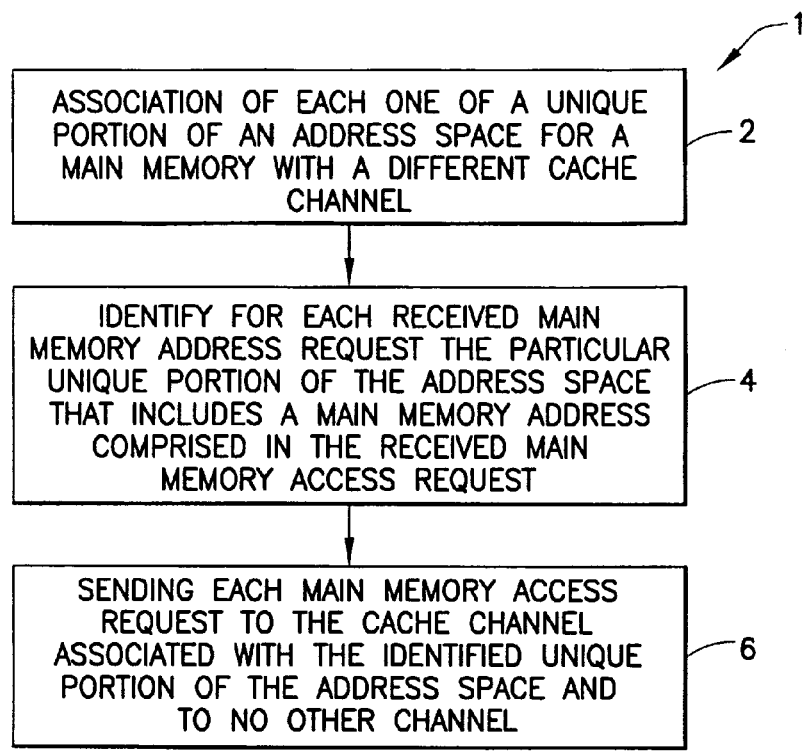

FIG. 1 schematically illustrates a method 1 relating to the use of a multi-channel cache memory for a memory. The memory has an address space that is typically greater than the capacity of the multi-channel cache memory. The memory is accessed using memory access requests, each of which comprises a memory address.

Figures 2A, 2B:
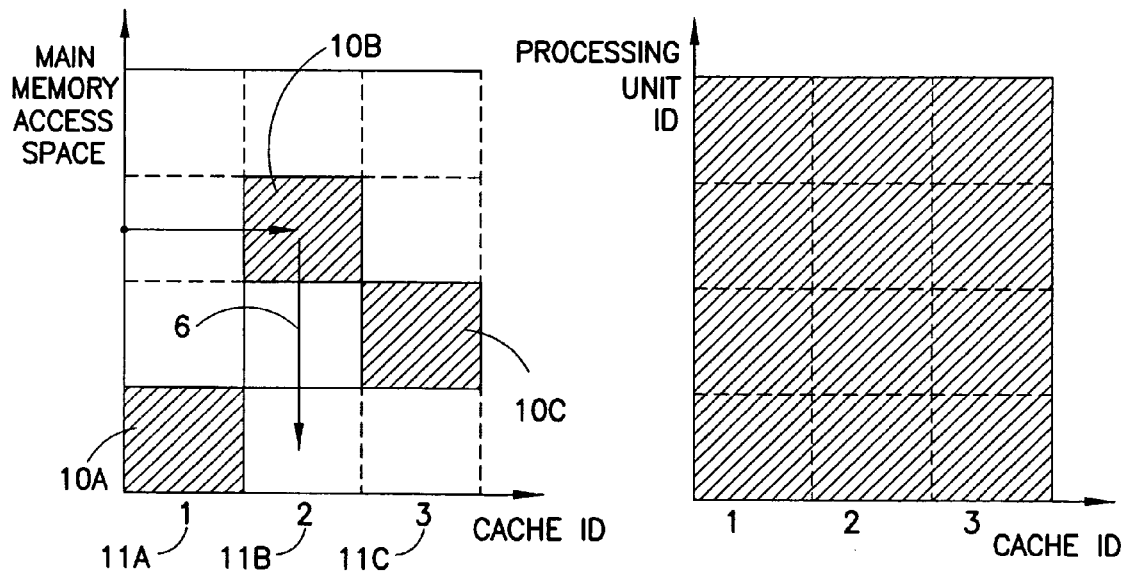
FIG. 2A illustrates that the allocation of a cache to a memory access request is dependent on the memory address included in the memory access.
FIG. 2B illustrates that the allocation of a cache to a memory access request is independent of the identity of the processing unit in respect of which the memory access request is made.

FIG. 2A schematically illustrates how the address space of the memory may be separated into a plurality of defined portions 10A, 10B, 10C. In this particular example, the portions 10A, 10B, 10C are non-overlapping portions. Each of these portions 10A, 10B, 10C shall be referred to as unique address spaces 10 because each of them, at any particular moment in time, is a unique usable portion of the address space of the memory that includes one or more addresses that are not included, for use at that particular moment in time, in any of the other defined portions.

Referring back to block 2 of FIG. 1, each of the unique address spaces 10 is associated with a different cache channel 11A, 11B, 11C. This association is illustrated graphically in FIG. 2A, where each unique address spaces 10A, 10B, 10C is associated with only one of the cache channels 11A, 11B, 11C.

The association is recorded in suitable storage for future use. The association may be direct, for example, a cache block 20 (FIG. 4) used for a cache channel may be explicitly identified. The association may be indirect, for example, an output interface that serves only a particular cache block may be explicitly identified.

In block 4 in FIG. 1 each memory access request is processed. The memory address, from a received memory access request, is used to identify the unique address space 10 that includes that address.

Thus, referring to FIG. 2A, if a received memory access request includes a memory address 11, the defined unique address space 10B that includes the memory address 11 is identified. From the association, the particular cache channel 11B associated with the identified unique address space portion 10B is identified and allocated for use. The memory access request is then sent to the associated cache channel 11B.

It should be noted, from FIG. 2A, that it is not necessary for the whole of the memory address space to be spanned by the defined unique address spaces 10.

It should also be noted, that although the unique address spaces 10 are illustrated in FIG. 2A as including a consecutive series of addresses in the address space of the memory this is not necessary. The unique address spaces may be defined in any appropriate way so long as they remain unique. For example, any N bits (adjacent or not adjacent) of a memory address may be used to define $2^N$ (where N is an integer greater than or equal to 1) non-overlapping unique address spaces.

In some embodiments the memory access requests may be in respect of a single processing unit. In other embodiments the memory access requests may be in respect of multiple processing units. FIG. 2B illustrates that the allocation of a cache channel 11 to a memory access request is independent of the identity of the processing unit in respect of which the memory access request is made, whereas FIG. 2A illustrates that the allocation of a cache channel 11 to a memory access request is dependent on the memory address included in the memory access request and the defined unique address spaces 10.

In some embodiments the memory access requests may originate from the processing units that they are in respect of, whereas in other embodiments the memory access requests may originate at circuitry other than the processing units that they are in respect of. The response to a memory access request is returned to the processing unit that the memory access request is for.

Figure 3:
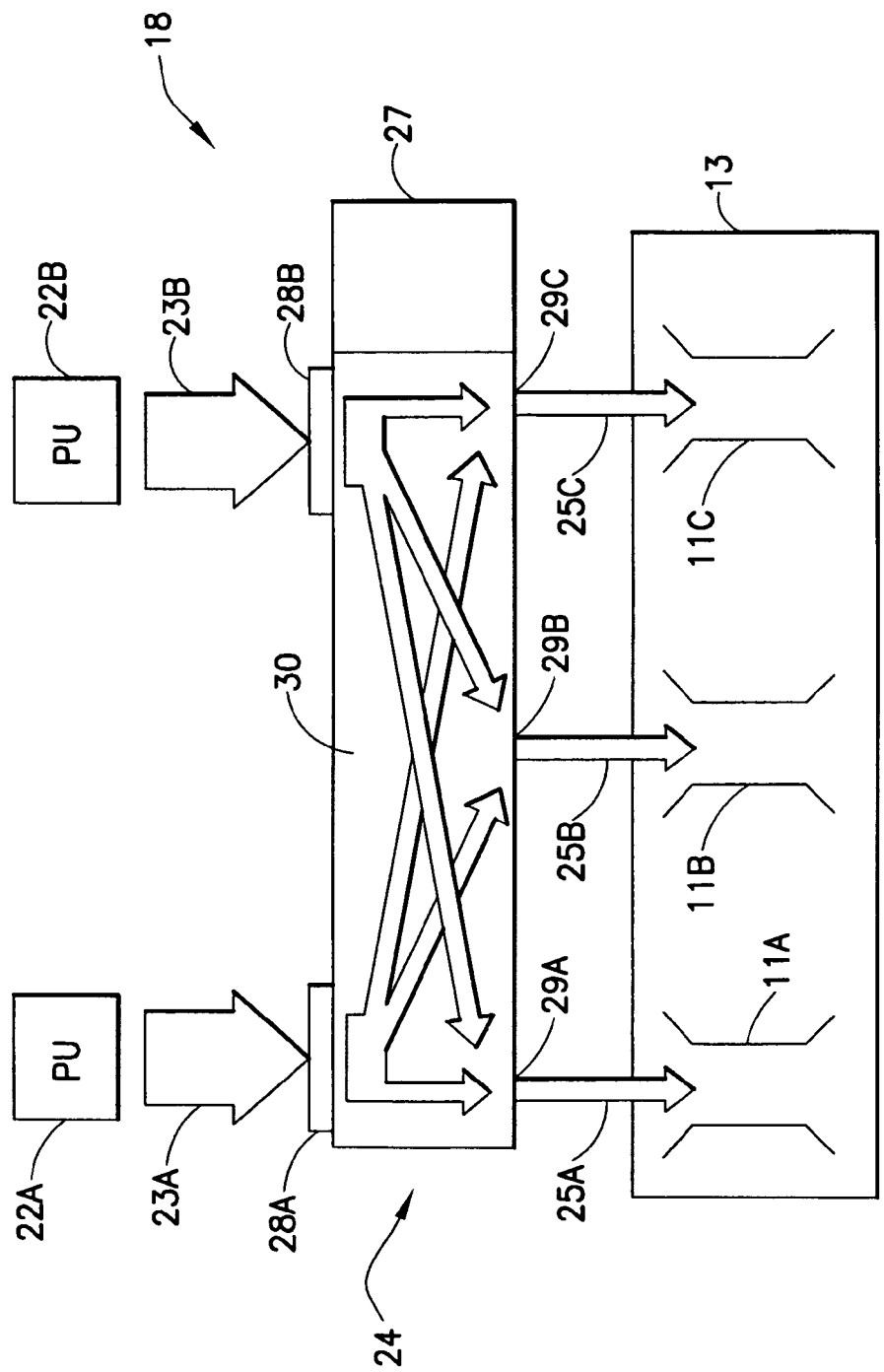

FIG. 3 schematically illustrates the functional components of a system 18 suitable for performing the method of FIG. 1.

The system 18 comprises: a plurality of cache channels 11A, 11B, 11C; arbitration circuitry 24; and multiple processing units 22A, 22B. Although a particular number of cache channels 11 are illustrated this is only an example, there may be M cache channels where M>1. Although a particular number of processing units 22 are illustrated this is only an example, there may be P processing units where P is greater than or equal to 1.

In this embodiment the first processing unit 22A is configured to provide first memory access requests 23A to the arbitration circuitry 24. The second processing unit 22B is configured to provide second memory access requests 23B to the arbitration circuitry 24. Each processing unit 22 can provide memory access requests to all of the cache channels 11A, 11B, 11C via the arbitration circuitry 24.

Each memory access request (depicted by an arrow 23) comprises a memory address. The memory access requests 23 may be described as corresponding to some amount of memory data associated with the memory address, which may be located anywhere in the main memory of the system.

The arbitration circuitry 24 directs a received memory access request 23, as a directed memory access request 25, to the appropriate cache channel based upon the memory address comprised in the request. Each cache channel 11 receives only the (directed) memory access requests 25 that include a memory address that lies within the unique address space 10 associated with the cache channel 11.

Each of the caches channels 11A, 11B, 11C serves a different unique address space 10A, 10B, 10C. A cache channel 11 receives only those memory access requests that comprise a memory address that falls within the unique address space 10 associated with that cache channel. Memory access requests (relating to different unique address spaces) are received and processed by different cache channels in parallel, that is, for example, during the same clock cycle.

However, as a single cache channel 11 may simultaneously receive memory access requests from multiple different processing units, the cache channel preferably includes circuitry for buffering memory access requests.

All of the cache channels 11A, 11B, 11C may be embodied within a single multichannel unit, or embodied within any combination of single-channel units only, or multi-channel units only, or both single-channel units and multi-channels units. The units may be distributed through the system 18 and need not be located at the same place.

In this example the arbitration circuitry 24 comprises input interfaces 28, control circuitry 30 and output interfaces 29.

In this particular non-limiting example the arbitration circuitry 24 comprises local data storage 27. In other implementations storage 27 may be in another component. The data storage 27 is any suitable storage facility which may be local or remote, and is used to store a data structure that associates each one of a plurality of defined, unique address spaces 10 with, in this example, a particular one of a plurality of different output interfaces 29.

In other implementations the association between each one of a plurality of defined, unique address spaces 10 with a cache channel may be achieved in other ways.

The input interface 28 is configured to receive memory access requests 23. In this example there are two input interfaces 28A, 28B. A first input interface 28A receives memory access requests 23A for a first processing unit 22A. A second input interface 28B receives memory access requests 23B for a second processing unit 22B.

Each of the output interfaces 29 is connected to only a respective single cache channel 11. Each cache channel 11 is connected to only a respective single output interface 29. That is, there is a one-to-one mapping between the output interfaces 29 and the cache channels 11.

The control circuitry 30 is configured to route received memory access requests 23 to appropriate output interfaces 29. The control circuitry 30 is configured to identify, as a target address, the memory address comprised in a received memory access request. The control circuitry 30 is configured to use the data storage 27 to identify, as a target unique address space, the unique address space 10 that includes the target address. The control circuitry 30 is configured to access the data storage 27 and select the output interface 29 associated with the target unique address space in the data storage 27. The selected output interface 29 is controlled to send the memory access request 25 to one cache channel 11 and to no other cache channel 11.

In this non-limiting example the selected access request may be for any one of a plurality of processing units, and the selection of an output interface 29 is independent of the identity of the processing unit for which the memory access request was made.

In this non-limiting example the control circuitry 30 is configured to process in parallel multiple memory access requests 23 and select separately, in parallel, different output interfaces 29.

The arbitration circuitry 24 may comprise buffers for each output interface 29. A buffer would then buffer memory access requests 25 for a particular output interface/cache channel. The operation of the arbitration circuitry 24 may be described as: receiving memory access requests 23 from a plurality of processing units 22; sending a received first memory access request 23A that comprises a first memory address to only a first cache channel 11A if the first memory address is from a defined first portion 10A of the address space of the memory, but not if the first memory address is from a portion 10B or 10C of the address space of the memory other than the defined first portion 10A of the address space of the memory; and sending the first memory access request 23A to only a second cache channel 11B if the first memory address is from a defined second portion 10B of the address space of the memory, but not if the first memory address is from a portion 10A or 10C of the address space of the memory other than the defined second portion 10B of the address space of the memory; sending a received second memory access request 23B that comprises a second memory address to only a first cache channel 11A if the second memory address is from a defined first portion 10A of the address space of the memory, but not if the second memory address is from a portion 10B or 10C of the address space of the memory other than the defined first portion 10A of the address space of the memory; and sending the second memory access request 23B to only a second cache channel 11B if the second memory address is from a defined second portion 10B of the memory but not if the second memory address is from a portion 10A or 10C of the address space of the memory other than the defined second portion 10B of the address space of the memory.

The implementation of the arbitration circuitry 24 and, in particular, the control circuitry 30 can be in hardware alone, or it may have certain aspects in software including firmware alone, or it can be a combination of hardware and software (including firmware).

Implementation of arbitration circuitry 24 and, in particular, the control circuitry 30, may be implemented using instructions that enable hardware functionality, for example, by using executable computer program instructions in a general-purpose or special-purpose processor that may be stored on a computer readable storage medium (disk, semiconductor memory, etc.) to be executed by such a processor.

One or more memory storage units may be used to provide cache blocks for the cache channels. In some implementations each cache channel 11 may have its own cache block that is used to service memory access request sent to that cache channel. The cache blocks may be logically or physically separated from other cache blocks. The cache blocks, if logically defined, may be reconfigured by moving the logical boundary between blocks.

Figure 4:
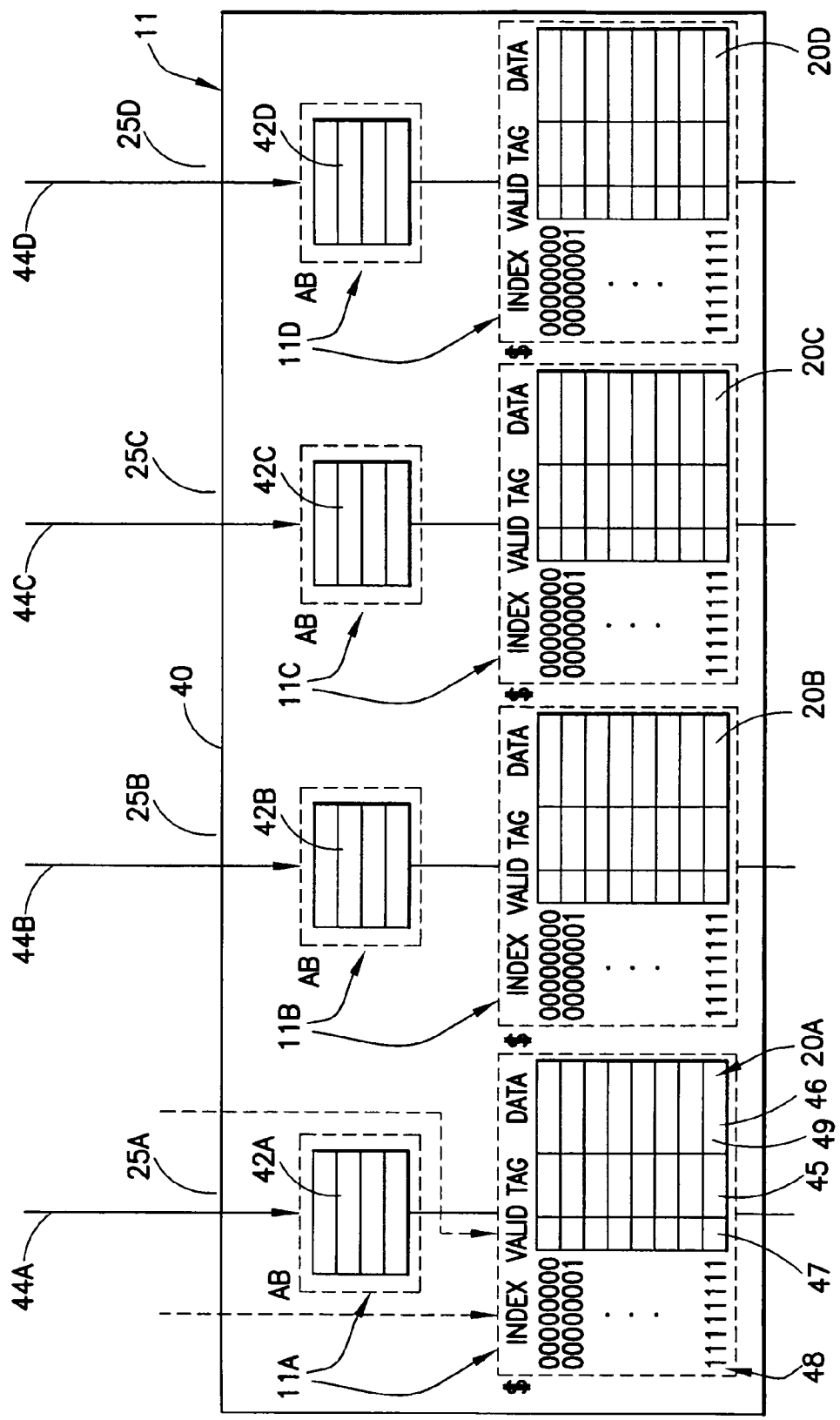

FIG. 4 schematically illustrates one of many possible implementations of a multi-channel cache memory unit 40. The multi-channel cache memory unit 40, in this example, includes (but need not be limited to) a plurality of parallel input ports 44A, 44B, 44C, 44D, collectively referred to as parallel input ports 44, and a plurality of cache blocks 20A, 20B, 20C, 20D, collectively referred to as cache blocks 20.

The cache blocks 20A, 20B, 20C and 20D are considered to be isolated one from another as indicated by the dashed lines surrounding each cache block 20. 'Isolation' may be, for example, 'coherency isolation' where a cache does not communicate with the other caches for the purposes of data coherency. 'Isolation' may be, for example, 'complete isolation' where a cache does not communicate with the other caches for any purpose. The isolation configures each of the plurality of caches to serve a specified address space of the memory. As the plurality of caches are not configured to serve any shared address space of the memory, coherency circuitry for maintaining coherency between cache blocks is not required and is absent.

The plurality of parallel input ports 44A, 44B, 44C, and 44D are configured to receive, in parallel, respective memory access requests 25A, 25B, 25C and 25D. Each parallel input port 44 receives only memory access requests for a single unique address space 10.

In this example each of the plurality of parallel input ports 44 is shared by the processing units 22 (but not by the cache blocks 20) and is configured to receive memory access requests for all the processing units 22. Each of the plurality of cache blocks 20 are arranged in parallel and as a combination are configured to process in parallel multiple memory access requests from multiple different processing units.

Each of the plurality of cache blocks 20 comprises a multiplicity of entries 49. In general, each entry includes means for identifying an associated data word and its validity. In the illustrated example each entry 49 comprises a tag field 45 and at least one data word 46. In this example, each entry also comprises a validity bit field 47. Each entry 49 is referenced by a look-up index 48. It should be appreciated that this is only one exemplary implementation.

The operation of an individual cache block 20 is well documented in available textbooks and will not be discussed in detail. For completeness, however, a brief overview will be given of how a cache block 20 handles a memory (read) access request. Note that this discussion of the operation of an individual cache block 20 should not be construed as indicating that it is known to provide a plurality of such cache blocks 20 in the context of a multi-channel cache memory in accordance with exemplary aspects of the invention.

An index portion of the memory address included in the received memory access request 25 is used to access the entry 49 referenced by that index. A tag portion of the received memory address is used to verify the tag field 45 of the accessed entry 49. Successful verification results in a 'cache hit' and the generation of a hit response comprising the word 46 from the accessed entry 49. An unsuccessful verification results in a 'miss', a read access to the memory and an update to the cache.

In the illustrated example each cache block 20 has an associated dedicated buffer 42 that buffers received, but not yet handled, memory access requests for the cache channel. These buffers are optional, although their presence is preferred to resolve at least contention situations that can arise when two or more PUs attempt to simultaneously access the same cache channel.

The multi-channel cache memory unit 40 may, for example, be provided as a module. As used here 'module' may refer to a unit or apparatus that excludes certain parts/components that would be added by an end manufacturer or a user.

FIG. 5 schematically illustrates one example of a physical implementation of the system 18 previously described with reference to FIG. 3. In this example, the multiple processing units 22A, 22B, 22C are part of an accelerator 50 such as, for example, a graphics accelerator. The accelerator is optimized for efficient processing.

In this example, the arbitration circuitry 24 is an integral part of the accelerator 50. The accelerator 50 has a number of parallel interconnects 52 between the arbitration circuitry 24 and the multi-channel cache. Each interconnect connects a single output interface 29 of the arbitration circuitry 24 with a single cache input port 44.

The processing units 22 in this example include a general purpose processing unit (CPU) 22A, an application specific processing element (PE) 22B and a vector processing unit (VPU) 22C. The CPU 22A and the PE 22B generate their own memory access requests. The VPU 22C is a SIMD-type of processing element and, in this example, requires four parallel data words. Each processing unit executes its own tasks and accesses individually the memory 56.

Although FIG. 5 illustrates the arbitration circuitry 24 as being a part of the accelerator 50 it should be appreciated that the arbitration circuitry may, in some embodiments be a part of the multi-channel cache unit 40. In other embodiments, the arbitration circuitry 24 may be a part of the processing units. In still further embodiments, the arbitration circuitry 24 may be distributed over two or more of the previously mentioned locations.

The system 18 in this embodiment, and also in previously described embodiments, may perform a number of functions. For example, the arbitration circuitry 24 may re-define the unique address spaces and change the association recorded in storage 27. As a consequence, each cache block 20 may become associated with a different unique address space 10.

The control circuitry 30 of the arbitration circuitry 24 is configured to access the data storage 27 to re-define the unique address spaces and configured to generate at least one control signal for the cache blocks 20 as a consequence.

The arbitration circuitry 24 may re-define the unique address spaces after detecting a particular predetermined access pattern to the memory by a plurality of processing units 22. For example, the arbitration circuitry 24 may identify a predetermined access pattern to the memory by a plurality of processing units and then re-define the unique address spaces 10 based on that identification. The redefinition of the unique address spaces may enable more efficient use of the cache channels by increasing the percentage of hits. For example, the redefinition may increase the probability that all of the cache channels are successfully accessed in each cycle. The MCC memory unit 40 is configured to respond to the control signal by setting all of the validity bit fields 47 in the multi-channel cache memory unit 40 to invalid. A single global control signal may be used for all the cache blocks 20 or a separate control signal may be used for each cache block 20. In some embodiments, only portions of the unique address spaces 10 may be redefined and the separated control signals may be used to selectively set validity bits in the MCC memory unit 40 to invalid.

Referring to FIG. 6A there is shown a non-limiting example of an implementation of a memory access request 23. The memory access request 23 includes a read/write bit 60 that identifies if the access is for reading or for writing, an address field 62 that includes a memory address, and one or more identification references. In the illustrated example a memory access is for a particular processing unit 22 and the first identification reference 64 identifies that processing unit and a second identification reference 66 orders memory access requests for the identified processing unit.

When the cache block 20 receives a memory access request 25 and generates a response 70 following a cache look-up, the response includes the identification reference(s) received in the memory access request. FIG. 6B illustrates an example of a typical response 70 following a successful read access. The response 70 includes the accessed word 46 and also the first identification reference 64 and the second identification reference 66. The first identification reference 64 may enable routing of the response 70 to the particular processing unit 22 identified by the first identification reference 64. The second identification reference 66 may enable the ordering or re-ordering of responses 70 for a processing unit.

Having thus described the exemplary embodiments of the invention disclosed in commonly-owned PCT/EP2009/062076, the exemplary embodiments of this invention will now be described with respect to FIGS. 7-10.

It is first noted that increased HW parallelism in the form of multi-core processing, multi-channel cache and multi-channel DRAM can be expected to increase in order to enhance processing performance. The exemplary embodiments of this invention provide a channel controller for a multi-channel cache, such as the multi-channel cache 40 described above, and provide a means for parallel memory masters (e.g., multi-cores) to efficiently exploit the multi-channel cache 40. However, conventional cache management techniques will not be sufficient to operate the multi-channel cache 40 in order to fully exploit future parallel cache and data processing systems.

For example, it is desirable that the multi-channel cache 40 be properly configured for operation in a particular system environment, otherwise the capacity and bandwidth (throughput) capability of the cache may not be fully exploited.

In the example shown in FIG. 5 above the accelerator fabric 50 contains three processing units: the CPU (or microprocessor μP) 22A, the application-specific processing element PE 22B and the VPU 22C. The CPU 22A and the PE 22B generate one-word requests to the memory, while the VPU 22C is a SIMD-type of processing element and requires, in this example, four parallel data elements as an input. Each processing unit executes its own tasks and individually accesses the main memory 56. However, it should be noted that the accelerator fabric 50 can also be constructed using homogeneous processing units (e.g., all PEs 22B, or all VPUs 22C).

The exemplary embodiments of this invention provide a multi-channel cache controller (MCC CTRL) unit 102 (see FIG. 7) that is capable of managing multi-channel cache operation (e.g., channel allocations, configurations and EPM) with respect to the multi-channel cache 40, where the plurality of channels 52A-52D exist between the processing units 22A-22C and the multi-channel cache 40.

The multi-channel cache controller 102 manages the operation of the multi-channel cache 40 towards a MMU 100, or parallel operating multiple memory masters.

Figure 7:
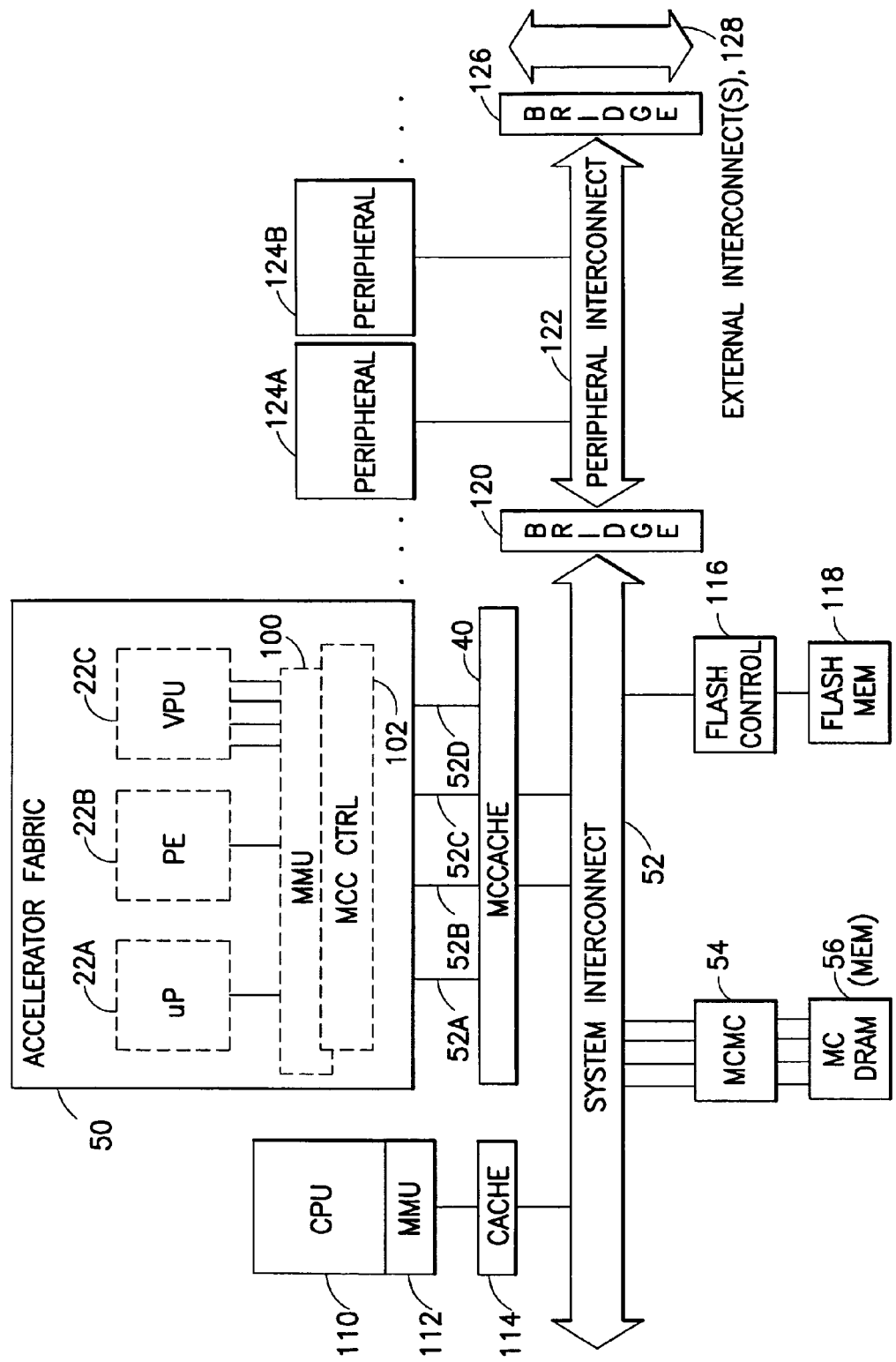

The MCC CTRL unit 102 may be co-located with the MMU 100 as illustrated in FIG. 7, or it may reside in the multi-channel cache 40, or it may reside in a particular system as a centralized unit, or it may be distributed functionally over the system.

Figure 8A:
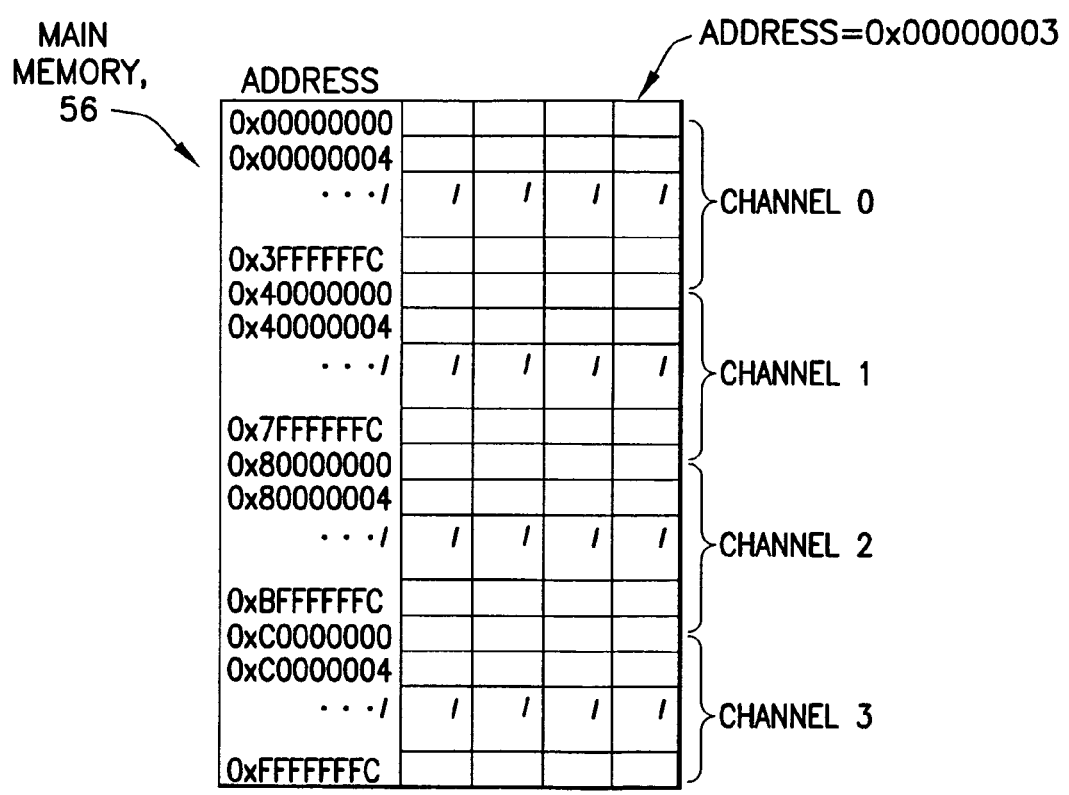
FIGS. 8A and 8B, collectively referred to as FIG. 8, show non-limiting examples of channel allocations with a 4-channel cache, where

One task of multi-channel cache channel management is to allocate the channels over the memory address space. A most straightforward way to allocate the channels is to divide the address space of the main memory 56 equally over the channels, as illustrated in FIG. 8A. As the allocation of the exemplary number of four channels is balanced over the memory space, each channel of the multi-channel cache 40 caches the same amount of the memory.

Figure 8B:
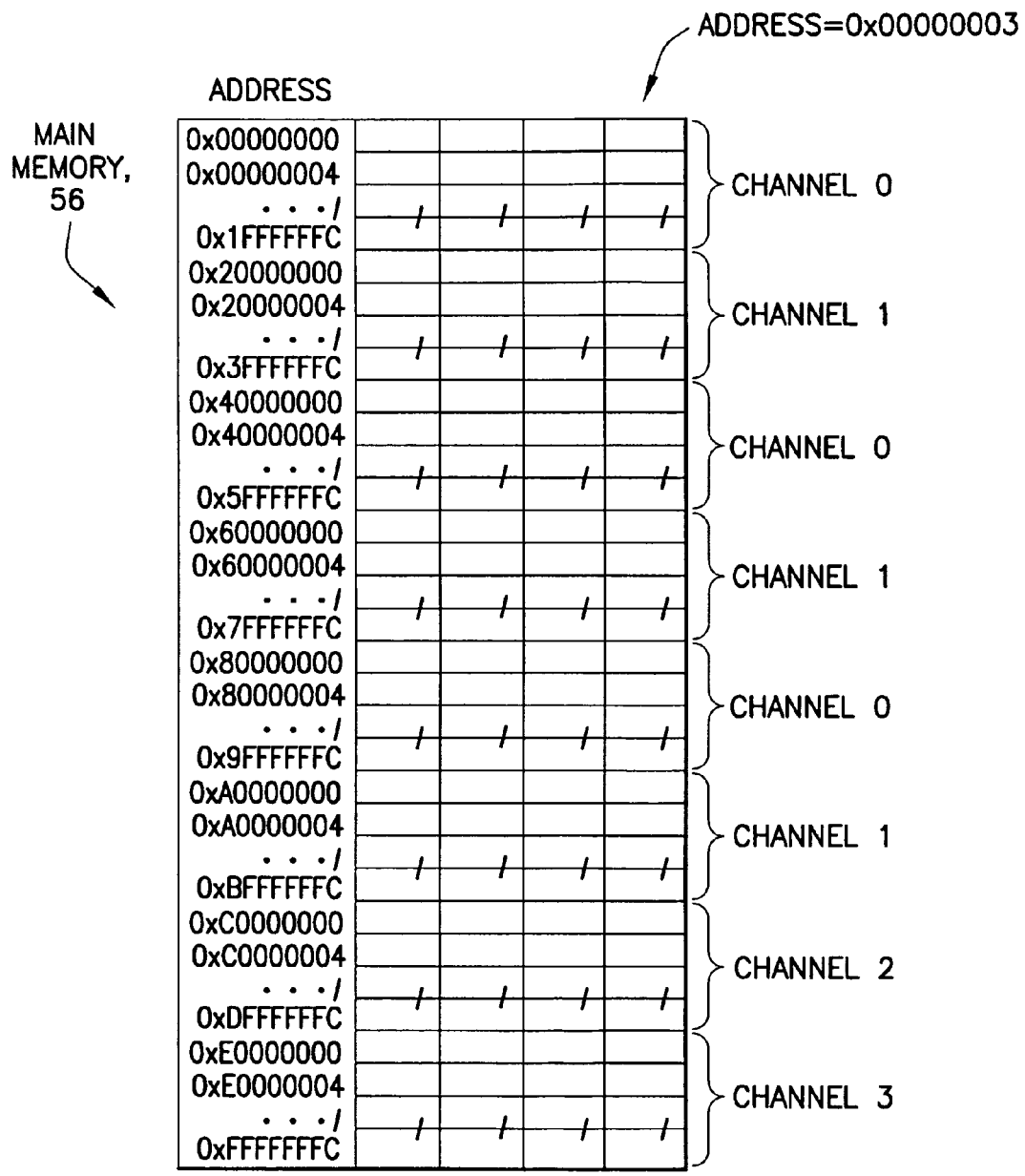

Alternatively the channels can be allocated unequally (unbalanced) over the main memory 56. This implies that the individual channels cache main memory regions that are of different sizes. This approach is illustrated in FIG. 8B. In this non-limiting example the caching is biased, meaning that two channels, channel_0 and channel_1 in this case, are allocated over three fourths of the main memory space, while channel_2 and channel_3 are together allocated only over one fourth of the address space of the main memory 56. As a result, memory region 0xC000000-0xFFFFFFFF has a proportionally larger cache, when assuming the same storage capacity in every cache channel.

The third technique, potentially more complex but also the most flexible, makes the channel allocation together with the memory allocation. This approach provides a means to allocate the multi-channel cache 40 in a way that resembles the memory allocation of the MMU 100. When a processing unit reserves a memory region from the MMU 100 the MCC CTRL 102 defines in which channel or channels the allocated memory region is cached. In this approach it is possible that there are regions of the memory address space that are not cached at all (for example, any region or regions of the main memory 56 not currently allocated for use by any particular processing unit (or application) or application using direct memory access (cache bypass)). The cache channel allocation can thus also be coupled with operation of the MMU 100.

FIG. 7 shows the accelerator fabric 50 of FIG. 5 in a wider system context. In the exemplary system context there can be at least one CPU 110 with an associated MMU 112 coupled with a conventional cache 114 connected to the system interconnect 52 and thus also to the main memory 56. In this example the main memory 56 is implemented with multi-channel (MC) DRAM, and is coupled to the system interconnect 52 via the MCMC 54. Also coupled to the system interconnect 52 is a Flash memory (non-volatile memory) 118 via a Flash controller 116. A bridge circuit 120 may be present for connecting the system interconnect 52 to a peripheral interconnect 122 that serves some number of peripheral components 124A, 124B. A further bridge circuit 126 may be used to couple the peripheral interconnect 122 to external interconnects 128, enabling connection with external circuits/networks. In this non-limiting example the MCC CTRL 102 is shown co-located with the MMU 100 as part of the accelerator fabric 50. However, and as was indicated above, the MCC CTRL 102 is not limited in its placement within the system.

The system shown in FIG. 7 may be any type of system including a personal computer (desktop or laptop), a workstation, a server, a router, or a portable user device such as one containing one or more of a personal digital assistant, a gaming device or console, and a portable, mobile communication device, such as a cellular phone, as several non-limiting examples.

During operation of the MMC CTRL 102 the channel allocation is determined by interpreting the memory address of a particular memory request. Address interpretation can be based on selected bit fields of the address bits, as depicted in FIG. 9A. In this approach the main memory address bit fields referring to the channel 130, tag 132, index 134 are selected with the configuration. The byte offset (BO) 136 is encoded by the least significant bits of the memory address. The example of FIG. 9A corresponds to the balanced channel allocation in FIG. 8A, where the two most significant address bits 31:30 directly encode channel numbers 0, 1, 2 and 3.

Another embodiment of address interpretation defines a logical relationship between the channel 130 and selected bits of the address, as shown in FIG. 9B. This example corresponds to the unbalanced allocation depicted in FIG. 8B. The unbalanced allocation is based on an address interpretation wherein the tag field 132 is extended in order to address the correct data. In order to support all possible biases the tag field 132 covers those bits that define the channel field 130 (note that in the example of FIG. 8B only bits 30 and 31 are needed). In this embodiment some logic 150 (e.g., combinatorial logic as shown, or a small look-up table) can be used to define relationships between, for example, three MSBs of the memory address and the channel field 130, and the two MSBs of the memory address are also used to define the two MSBs of the tag field 132. Note that the bit fields may vary in certain cases, and are a part of the configuration.

In another embodiment, one that manages the channel allocation together with the memory allocation, can use a table-based address interpretation. For example, in FIG. 9C the multi-channel cache 40 channel allocations are stored in a LUT 152, and memory address interpretation is performed by a LUT operation. Note that the contents of the LUT 152 can be fixed, or they can be programmable thereby enabling the channel allocations to be varied during operation of the system (e.g., during operation of the MMU 100 when allocating main memory region(s) for processing units or for specific applications), or at least at system boot-up time.

In another embodiment the previously described LUT-based operation can be embedded in a TLB present in the MMU 100. In this case the LUT 152 can be eliminated, and the channel 130, tag 132 and index 134 information is obtained during operation of the TLB of the MMU 100.

As is known, an important phase of memory access is translating an address from a virtual memory area into physical addresses in the main memory. To speed up this process a TLB can be used. The TLB may be considered as a local "cache" for recently used address translations. When the logical address is not found in the TLB (TLB miss), an address translation needs to be performed, either in HW or SW.

Figure 10:
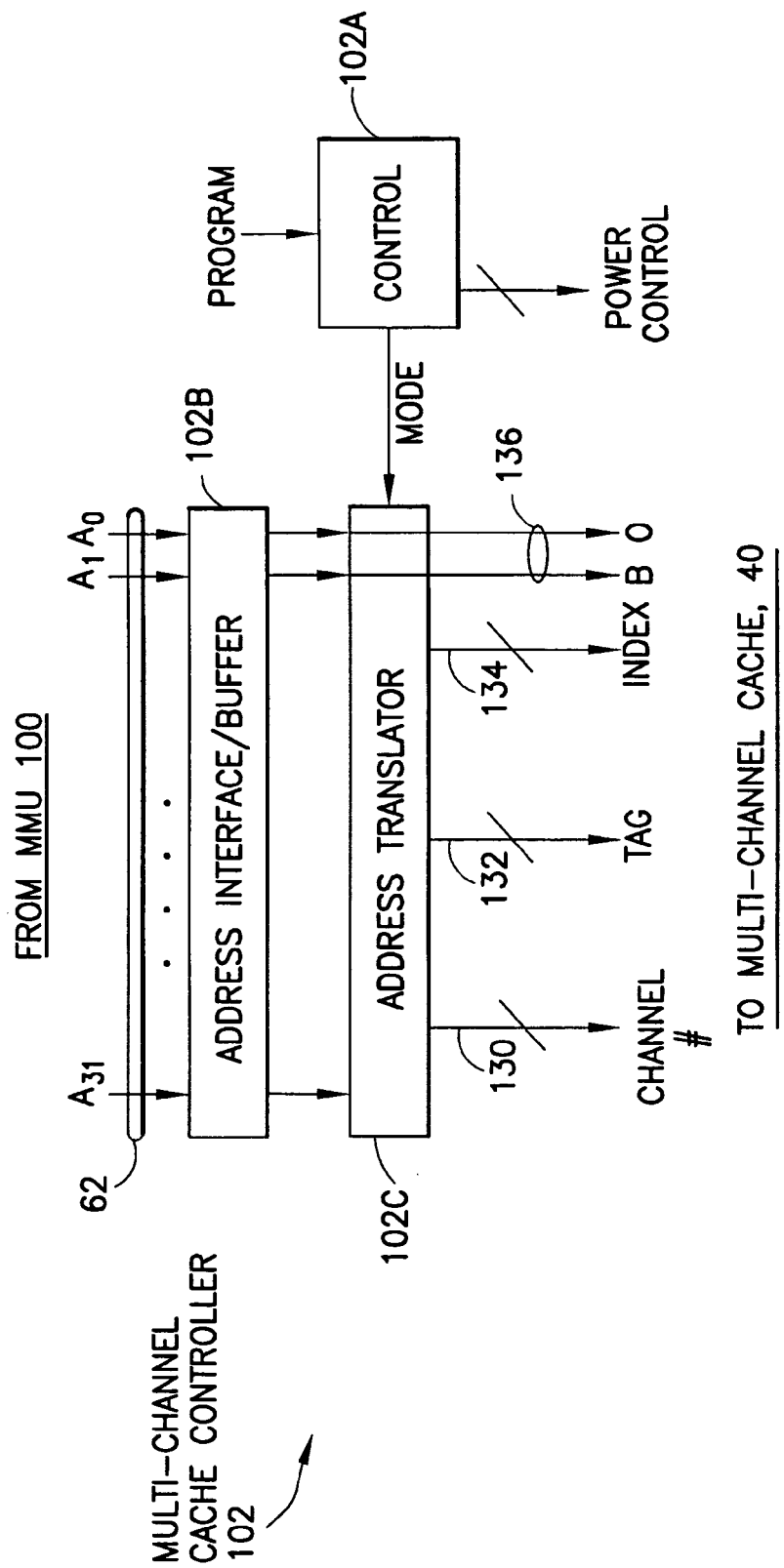

FIG. 10 shows the multi-channel cache controller 102 of FIG. 7 in greater detail. In this non-limiting embodiment the multi-channel cache controller 102 includes a control block 102A, an address interface/buffer 102B and an address translator 102C. The control unit 102A can be implemented in any desired manner, such as by discreet logic, or by a microcontroller operating with a stored SW program, or by a state machine, or by a combination of such devices/approaches. The address interface/buffer 102B can also be implemented in any desired manner, such as by discreet logic, or by a microcontroller operating with a stored SW program, or by a combination of such devices/approaches. The address interface/buffer 102B receives the memory access address 62 (see FIG. 6A) from the MMU 100 (i.e., $A_0$-$A_{31}$ in this non-limiting example that happens to use a 32-bit memory address), and may buffer multiple received memory addresses. For each received memory address the address translator 102C outputs the channel number 130, tag 132 and index 134 fields towards the multi-channel cache 40. The channel number field 130 is used to select one of the channels of the multi-channel cache 40 for read or write access at the specified address tag/index. The address translator 102C performs a desired translation of at least address bits $A_2$-$A_{31}$ (the two LSBs of the address bus that form the BO field 136 may be simply passed through the address translator 102C as shown). The address translator operates in accordance with a mode input from the control block 102A. In one mode the address bits may be simply passed through the address translator 102C to implement the mode shown in FIG. 9A. In a second mode some of the address bits are passed though the address translator 102C, while others are modified by logic (the logic 150 shown in FIG. 9B). In this non-limiting example the address bits $A_2$-$A_{11}$ are simply passed through to form the index field 134, address bits $A_{12}$-$A_{28}$ are passed through to form a part of tag field 132, while address bits $A_{29}$-$A_{31}$ are translated/decoded by the logic 150 to form the remainder of the tag field 132 and the channel number field 130. In a further mode of operation the address translator 102 can use the LUT 152 of FIG. 9C to map $A_2$-$A_{31}$ to the channel 130, tag 132 and index 134 fields. In this manner the multi-channel cache controller 102 can be used to achieve the balanced memory allocation of FIG. 8A or the unbalanced allocation shown in FIG. 8B (or any other desired unbalanced configuration). The control block 102A can include a program input sourced from other logic (e.g., from the MMU 100) so as to initially establish and then possibly change the state of the mode input to the address translator 102C during operation of the system. Note that the contents of the LUT 152 may also be re-programmed if desired, thereby enabling the unbalanced memory allocations to be changed if desired during boot-up and/or during operation of the system. Note also that the other components of the memory access request, such as the R/W field 60, IDPU field 64 and access number field 66 shown in FIG. 6A, can be simply passed through the multi-channel cache controller 102 in association with the related memory address and the translated version thereof. FIG. 10 also shows a power control output of the control unit 102A, described in further detail below.

The described MCC CTRL 102 also accommodates other configurations. For example, cache channels can be also configured in groups or in channel clusters, and different channel clusters may have different configurations. Cluster configuration can be determined based on the nature of processing and/or on historical information. LUT-based channel allocation/address interpretation allows the channels to be allocated freely, meaning that processes are mapped on an appropriate channel cluster. The first two approaches, direct interpretation of the address (FIG. 9A) or the use of logic 150 (FIG. 9B) may imply some understanding of the cache configuration by the MMU 100.

As considered herein, then, a "channel cluster" can be considered to be some logical grouping of two or more cache channels. The two or more cache channels may be defined by two or more contiguous main memory address spaces, or they may be defined by two or more non-contiguous main memory address spaces.

When viewed from a channel perspective, a channel cluster can be considered as a group of channels that can be configured in an independent manner. Regarding the non-limiting example in FIG. 8 there is only one cluster, as the entire MCC 40 is configured in the same manner. A minimum size of a cluster is one channel, and an upper limit on the cluster size is the total number of channels. The number of clusters and cluster sizes can be considered as part of the overall configuration.

When channel clusters are used one can still allocate the memory address space over all of the channels, but then within a channel cluster (or mapped memory address space) the address can be interpreted differently than in another channel cluster. In this non-limiting approach the channel "dominates" the addressing, and the cluster is not visible in a memory map (such as the memory maps illustrated in FIG. 8). Thus the channel cluster is not necessarily interpreted explicitly, i.e., certain channel(s) are considered to simply belong to some certain channel cluster (or configuration).

The cluster can be also viewed as an additional hierarchical level. After identifying the cluster, all (or some) of the clusters can contain, e.g., a channel with ID 1. For example, channel cluster 1 and channel cluster 2 can both contain a separate channel with the same channel ID 1. This approach implies the use of cluster interpretation.

In certain cases the use of clusters can simplify the logic to define the channel, and the end result can be similar to the non-limiting example shown in FIG. 8. Clusters also provide more flexibility for the MCC 40, especially with several channels. Basically, the channels can be partitioned into groups (clusters), and the multi-channel cache 40 then operates within the clusters.

In general, the memory tags and indices can remain as a lower referential level, while additional references to data can be used above the lower referential level. This can be particularly true as the size (data storage capacity) of the MCC 40 becomes large. For example, in accordance with the exemplary embodiments discussed above channels are used to define partitions within the MCC 40, and each channel can contain the same indices. In this case the channel is identified first, followed by elements of the channel (e.g., tags, indices). However, it is also within the scope of the exemplary embodiments to define one or more hierarchical levels above the channel level, such as channel clusters, where each channel cluster can contain the same channel references or IDs. In this case then the channel cluster is identified first, followed by the channel, followed by the index and tag, as a non-limiting example. Further, it is within the scope of the exemplary embodiments to define a higher hierarchical level, such as a "cluster farm", where each cluster farm may contain the same channel cluster references or IDs, and thus the first reference is to the correct cluster farm, followed by the channel cluster, followed by the channel, and so forth. The cluster farm may be viewed as a cluster of channel clusters.

Thus, it can be appreciated that the multi-channel cache controller 102 operates to translate a memory address to form a first access portion identifying at least one partition of the multi-channel cache memory 40, and at least one further access portion, where the at least one partition is comprised of at least one channel. That is, the at least one partition is comprised of one of a channel, or a channel cluster, or a cluster of channel clusters, and so forth to even higher levels of the hierarchy. Two different channel clusters can each comprise the same channel identifier. One particular physical channel can be part of only one cluster, but several clusters can contain the same channel identifier, which then refers to different physical channels. Two different clusters of channel clusters can each comprise the same channel cluster identifier.

It should be noted that the description of the output of the MCC controller 102 should not be viewed as limiting, as in other embodiments the outputs may be varied to accommodate different multi-channel cache architectures and sizes. In general, the MCC controller 102 may be considered to function to locate and check correspondence and validity of data. That is, the MCC controller 102 operates to locate (e.g., the channel identifier and the index, and possibly also a channel cluster), to determine correspondence (e.g., tag comparison and verification of a correct region in the main memory 56), and to determine validity (current state of the valid bit).

As was noted above, it is also within the scope of the exemplary embodiments to provide power control, such as by shutting off one or more multi-channel cache channels that are not needed at a particular point in time. The control unit 102A may also operate channels partially, e.g., half of the storage in a particular cache channel may be disabled to conserve energy. For example, assuming a bank-based cache channel storage approach, using bank-based features of some current DRAM memories, if a particular cache channel is implemented with four-bank storage one, two or three banks may be currently unused and placed in a power-down mode.

As was also noted above, the exemplary embodiments of this invention can reallocate or re-map or configure the multi-channel cache 40 when processing load or some other requirements or conditions change. This can be accommodated using, for example, the program input shown in FIG. 10.

The use of the exemplary embodiments of this invention provides a technique to reorganize data for parallel processing. That is, the embodiments provide a technique to access data in parallel with a plurality of different access patterns without regard for how data is originally stored. For example, sequential memory addresses can be mapped into different cache channels and then accessed in parallel. Thus, there is provided support for parallel data access patterns, as the multi-channel cache 40 can be configured in such a way that data is accessible in parallel regardless of the main memory location of the data.

It should be appreciated that the functionality can be independent of and separated from the rest of the memory system. This implies that a memory request address is provided to the memory, and the multi-channel cache 40 operates to accelerate memory access times in an invisible manner, with no effect on, for example, the provided SW.

The use of these exemplary embodiments provides a number of technical advantages and technical effects. For example, the multi-channel cache 40 provides enhanced utilization possibilities, and can provide additional beneficial functionality as compared to conventional caches (such as by providing permutation of data and parallelization of data accesses).

The exemplary embodiments are also amenable to inclusion in large and complex data processing systems in order to reduce complexity and HW overhead (e.g., a single shared multi-channel cache 40 can be used as opposed to a plurality of individual caches). The use of these exemplary embodiments also provides scalability through the use of power down/off modes, and thus reduces run-time cost when not needed. In addition, the inherent reconfigurability and scalability provide adaptive behavior, as the overall data processing system can adjust its operation based on usage information (e.g., histogram) and/or other metadata. The exemplary embodiments also enable the use of application-specific configurations, such as an ability to allocate more cache channels for those applications requiring a larger memory throughput. The use of the above-described channel clustering is one possible technique to provide higher memory throughput for certain applications.

Based on the foregoing it should be apparent that the exemplary embodiments of this invention provide a method, apparatus and computer program(s) to provide a channel controller for use with a multi-channel cache memory.

Figure 11:
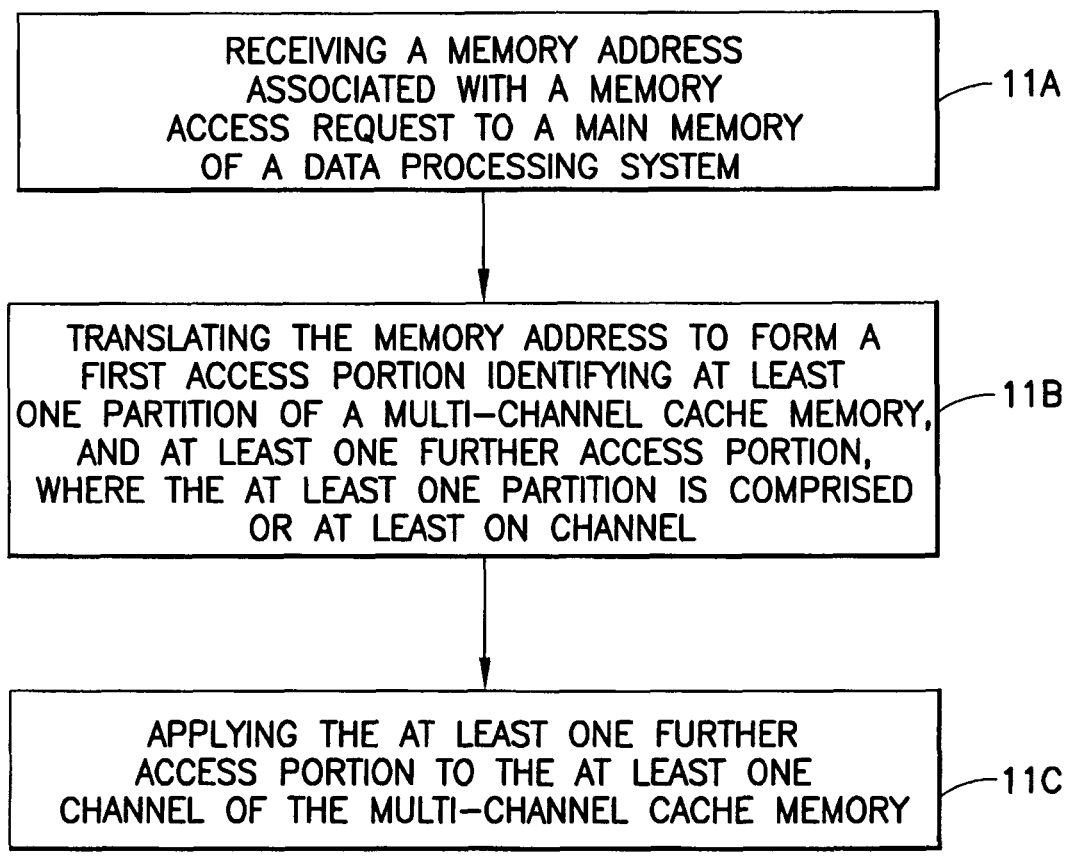

FIG. 11 is a logic flow diagram that illustrates the operation of a method, and a result of execution of computer program instructions, in accordance with the exemplary embodiments of this invention. In accordance with these exemplary embodiments a method performs, at Block 11A, a step of receiving a memory address associated with a memory access request to a main memory of a data processing system. At Block 11B there is a step of translating the memory address to form a first access portion identifying at least one partition of a multi-channel cache memory, and at least one further access portion, where the at least one partition is comprised of at least one channel. At Block 11C there is a step of applying the at least one further access portion to the at least one channel of the multi-channel cache memory.

Further in accordance with the method shown in FIG. 11, where translating forms the at least one further access portion to comprise at least a second access portion comprised of a multi-channel cache tag value, and a third access portion comprised of a multi-channel cache index value Further in accordance with the method recited in the preceding paragraph, where translating comprises using A bits of the memory address to form the first access portion, B bits of the memory address to form the second access portion and C bits of the memory address to form the third access portion.

Further in accordance with the method as recited in the preceding paragraphs, where translating comprises using A most significant bits of memory address to form the first access portion, B next most significant bits of the memory address to form the second access portion and C next most significant bits of the memory address to form the third access portion.

Further in accordance with the method as recited in certain of the preceding paragraphs, where translating comprises using A most significant bits of memory address to form the first access portion and some of the second access portion, B next most significant bits of the memory address to form the remainder of the second access portion and C next most significant bits of the memory address to form the third access portion.

Further in accordance with the method as recited in certain of the preceding paragraphs, where translating comprises applying at least some of the memory address to a look-up table that outputs in response at least the first, second and third access portions.

Further in accordance with the method as recited in the preceding paragraphs, where each channel of the multi-channel cache memory space maps to a region of the main memory space that is the same size.

Further in accordance with the method as recited in certain of the preceding paragraphs, where at least one channel of the multi-channel cache memory space maps to a region of the main memory space that is of a different size than the size of a region of main memory space mapped to another channel.

Further in accordance with the method as recited in the preceding paragraphs, where the channels of the multi-channel cache memory are mapped to the main memory in such a manner that data stored in consecutive main memory address locations are accessed in parallel in the multi-channel cache memory.

Further in accordance with the method as recited in the preceding paragraphs, where the channels of the multi-channel cache memory are mapped to the main memory in such a manner that at least a portion of the multi-channel cache memory can be placed in a low power mode of operation.

Further in accordance with the method as recited in the preceding paragraphs, where the at least one partition is comprised of one of a channel, or a channel cluster, or a cluster of channel clusters, where two different channel clusters can each comprise a same channel identifier, and where two different clusters of channel clusters can each comprise the same channel cluster identifier.

Further in accordance with the method as recited in the preceding paragraphs, further comprising establishing at system boot time how the translating forms the access portions in response to receiving a memory address.

Further in accordance with the method as recited in the preceding paragraphs, further comprising changing during operation of the system how the translating forms the access portions in response to receiving a memory address.

Further in accordance with the method as recited in the preceding paragraphs, where the multi-channel cache memory comprises a plurality of parallel input ports, each of which corresponds to one of the channels, and configured to receive, in parallel, memory access requests, each parallel input port is configured to receive a memory access request for any one of a plurality of processing units, and where the multi-channel cache memory further comprises a plurality of cache blocks wherein each cache block is configured to receive memory access requests from a unique one of the plurality of input ports such that there is a one-to-one mapping between the plurality of parallel input ports and the plurality of cache blocks, where each of the plurality of cache blocks is configured to serve a unique portion of an address space of the memory.

The various blocks shown in FIG. 11 may be viewed as method steps, and/or as operations that result from operation of computer program code, and/or as a plurality of coupled logic circuit elements constructed to carry out the associated function(s).

The exemplary embodiments also encompass a tangible memory medium that stores computer software instructions, the execution of which results in performing the method as in any of the preceding paragraphs.

The exemplary embodiments also encompass an apparatus that comprises a receiver configured to receive a memory address associated with a memory access request to a main memory; a translator configured to translate the received memory address to form a first access portion identifying at least one partition of a multi-channel cache memory and at least one further access portion, where the at least one partition is comprised of at least one channel; and an output configured to apply the at least one further access portion to the identified at least one channel of the multi-channel cache memory.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

The exemplary embodiments of this invention are not to be construed to being limited for use with only the number (32) of address bits described above, as more or fewer address bits may be present in a particular implementation. Further, the multi-channel cache memory 40 may have any desired number of channels equal to two or more. In this case then other than two MSBs of the memory address may be decoded to identify a particular channel number of the multi-channel cache. For example, if the multi-channel cache memory 40 is constructed to include eight parallel input ports then the three MSBs of the address can be decoded to identify one of the parallel input ports (channels). The numbers of bits of the tag and index fields may also be different than the values discussed above and shown in the Figures. Other modifications to the foregoing teachings may also occur to those skilled in the art, however such modifications will still fall within the scope of the exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving a memory address associated with a memory access request to a main memory of a data processing system;
   translating the memory address to form a first access portion identifying at least one partition of a multi-channel cache memory, and at least one further access portion, where the at least one partition is comprised of at least one cache channel, where the multi-channel cache memory is comprised of at least two cache channels, where a first cache channel is comprised of a first cache channel storage associated with a first unique portion of an address space of the main memory, and where a second cache channel is comprised of a second cache channel storage associated with a second unique portion of the address space of the main memory, where said first cache storage and said second cache storage are isolated one from the other such that the first cache channel storage serves only the first unique portion of the address space of the main memory and the second cache channel storage serves only the second unique portion of the address space of the main memo and no portion of the address space of the main memory is served by both the first cache storage and the second cache storage; and
   applying the at leas one further access portion to the at least one cache channel of the multi-channel cache memory.

2. The method as in claim 1, where translating forms the at least one further access portion to comprise at least a second access portion comprised of a multi-channel cache tag value, and a third access portion comprised of a multi-channel cache index value.

3. The method of claim 2, where translating comprises using A bits of the memory address to form the first access portion, B bits of the memory address to form the second access portion and C bits of the memory address to form the third access portion.

4. The method of claim 2, where translating comprises using A most significant bits of memory address to form the first access portion, B next most significant bits of the memory address to form the second access portion and C next most significant bits of the memory address to form the third access portion.

5. The method of claim 2, where translating comprises using A most significant bits of memory address to form the first access portion and some of the second access portion, B next most significant bits of the memory address to form the remainder of the second access portion and C next most significant bits of the memory address to form the third access portion.

6. The method of claim 2, where translating comprises applying at least some of the memory address to a look-up table that outputs in response at least the first, second and third access portions.

7. The method of claim 1, where each cache channel of the multi-channel cache memory space maps to a region of the main memory space that is the same size.

8. The method of claim 1, where at least one cache channel of the multi-channel cache memory space maps to a region of the main memory space that is of a different size than the size of a region of main memory space mapped to another cache channel.

9. The method of claim 1, where the cache channels of the multi-channel cache memory are mapped to the main memory in such a manner that data stored in consecutive main memory address locations are accessed in parallel in the multi-channel cache memory.

10. The method of claim 1, where the cache channels of the multi-channel cache memory are mapped to the main memory in such a manner that at least a portion of the multi-channel cache memory can be placed in a low power mode of operation.

11. The method as in claim 1, further comprising establishing at system boot time how the translating forms the access portions in response to receiving a memory address.

12. The method as in claim 1, further comprising changing during operation of the system how the translating forms the access portions in response to receiving a memory address.

13. The method of claim 1, where the multi-channel cache memory comprises a plurality of parallel input ports, each of which corresponds to one of the cache channels, and configured to receive, in parallel, memory access requests, each parallel input port is configured to receive a memory access request for any one of a plurality of processing units, and where the multi-channel cache memory further comprises a plurality of cache blocks wherein each cache block is configured to receive memory access requests from a unique one of the plurality of input ports such that there is a one-to-one mapping between the plurality of parallel input ports and the plurality of cache blocks, where each of the plurality of cache blocks is configured to serve a unique portion of an address space of the memory.

14. A tangible memory medium that stores computer software instructions the execution of which results in performing the method of claim 1.

15. A method, comprising:
   receiving a memo address associated with a memory access request to a main memo of a data processing system;
   translating the memory address to form a first access portion identifying at least one partition of a multi-channel cache memory, and at least one further access portion, where the at least one partition is comprised of at least one cache channel, where the multi-channel cache memory is comprised of at least two cache channels, where a first cache channel is comprised of a first cache channel storage associated with a first unique portion of an address space of the main memory, and where a second cache channel is comprised of a second cache channel storage associated with a second unique portion of the address space of the main memory; and
   applying the at least one further access portion to the at least one cache channel of the multi-channel cache memory;
   where the at least one partition is comprised of one of a cache channel, or a cache channel cluster, or a cluster of cache channel clusters, where two different cache channel clusters can each comprise a same cache channel identifier, and where two different clusters of cache channel clusters can each comprise the same cache channel cluster identifier.

16. An apparatus, comprising:
   a receiver configured to receive a memory address associated with a memory access request to a main memory;
   a translator configured to translate the received memory address to form a first access portion identifying at least one partition of a multi-channel cache memory and at least one further access portion, where the at least one partition is comprised of at least one cache channel, where the multi-channel cache memory is comprised of at least two cache channels, where a first cache channel is comprised of a first cache channel storage associated with a first unique portion of an address space of the main memory, and where a second cache channel is comprised of a second cache channel storage associated with a second unique portion of the address space of the main memory, where said first cache storage and said second cache storage are isolated one from the other such that the first cache channel storage serves only the first unique portion of the address space of the main memory and the second cache channel storage serves only the second unique portion of the address space of the main memory, and no portion of the address space of the main memory is served by both the first cache storage and the second cache storage; and an output configured to apply the at least one further access portion to the identified at least one cache channel of the multi-channel cache memory.

17. The apparatus as in claim 16, where said translator forms the at least one further access portion to comprise at least a second access portion comprised of a multi-channel cache tag value, and a third access portion comprised of a multi-channel cache index value.

18. The apparatus of claim 17, where said translator uses A bits of the memory address to form the first access portion, B bits of the memory address to form the second access portion and C bits of the memory address to form the third access portion.

19. The apparatus of claim 17, where said translator uses A most significant bits of memory address to form the first access portion, B next most significant bits of the memory address to form the second access portion and C next most significant bits of the memory address to form the third access portion.

20. The apparatus of claim 17, where said translator uses A most significant bits of memory address to form the first access portion and some of the second access portion, B next most significant bits of the memory address to form the remainder of the second access portion and C next most significant bits of the memory address to form the third access portion.

21. The apparatus as in claim 17, where said translator applies at least some of the memory address to a look-up table that outputs in response at least the first, second and third access portions.

22. The apparatus of claim 16, where each cache channel of the multi-channel cache memory space maps to a region of the main memory space that is the same size.

23. The apparatus of claim 16, where at least one cache channel of the multi-channel cache memory space maps to a region of the main memory space that is of a different size than the size of a region of main memory space mapped to another cache channel.

24. The apparatus of claim 16, where the cache channels of the multi-channel cache memory are mapped to the main memory in such a manner that data stored in consecutive main memory address locations are accessed in parallel in the multi-channel cache memory.

25. The apparatus of claim 16, where the cache channels of the multi-channel cache memory are mapped to the main memory in such a manner that at least a portion of the multi-channel cache memory can be placed in a low power mode of operation.

26. The apparatus as in claim 16, where said translator is configured to establish at boot time how said translator forms the access portions in response to a received memory address.

27. The apparatus as in claim 16, where said translator is configured to change during operation of said translator how said translator forms the access portions in response to a received memory address.

28. The apparatus of claim 16, where the multi-channel cache memory comprises a plurality of parallel input ports, each of which corresponds to one of the cache channels, and configured to receive, in parallel, memory access requests, each parallel input port is configured to receive a memory access request for any one of a plurality of processing units, and where the multi-channel cache memory further comprises a plurality of cache blocks wherein each cache block is configured to receive memory access requests from a unique one of the plurality of input ports such that there is a one-to-one mapping between the plurality of parallel input ports and the plurality of cache blocks, where each of the plurality of cache blocks is configured to serve a unique portion of an address space of the memory.

29. The apparatus as in claim 16, embodied at least partially within an integrated circuit.

30. An apparatus, comprising:

a receiver configured to receive a memory address associated with a memory access request to a main memory;

a translator configured to translate the received memory address to form a first access portion identifying at east one partition of multi-channel cache memory and at least on her access portion, where the at least one partition is comprised of at least one cache channel where the multi-channel cache memory is comprised of at least two cache channels here a first cache channel comprised of a first cache channel storage associated with a first unique portion of an address space of the main memory, and where a second cache channel is comprised of a second cache channel storage associated with a second unique portion of the address space of the main memory; and an output configured to apply the at least one further access portion to the identified a east one cache channel of the multi-channel cache memory;

where the at least one partition is comprised of one of a cache channel, or a cache channel cluster, or a cluster of cache channel clusters, where two different cache channel clusters can each comprise a same cache channel identifier, and where two different clusters of cache channel clusters can each comprise the same cache channel cluster identifier.

* * * * *

UNITED STATES PATENT AND TRADEMARK OFFICE
CERTIFICATE OF CORRECTION

PATENT NO.         : 8,661,200 B2
APPLICATION NO.    : 12/701171
DATED              : February 25, 2014
INVENTOR(S)        : Nikari et al.

Page 1 of 1

It is certified that error appears in the above-identified patent and that said Letters Patent is hereby corrected as shown below:

In the Claims:

In Claim 1:
Column 17, line 26, "memo" should be deleted and --memory-- should be inserted.

Column 17, line 29, "leas" should be deleted and --least-- should be inserted.

In Claim 15:
Column 18, line 33, "memo" should be deleted and --memory-- should be inserted.

Column 18, line 34, "memo" should be deleted and --memory-- should be inserted.

In Claim 30:
Column 20, lines 34-36, "east one partition of multi-channel cache memory and at least on her" should be deleted and --least one partition of a multi-channel cache memory and at least one further-- should be inserted.

Column 20, line 39, "here a first cache channel comprised" should be deleted and --where a first cache channel is comprised-- should be inserted.

Column 20, line 47, "a east" should be deleted and --at least-- should be inserted.

Signed and Sealed this
Twenty-seventh Day of May, 2014

Michelle K. Lee
*Deputy Director of the United States Patent and Trademark Office*